United States Patent [19]

Wu et al.

[11] Patent Number: 5,338,481
[45] Date of Patent: Aug. 16, 1994

[54] ASYMMETRICAL NONPOLAR DIPHENYL-DIACETYLENE LIQUID CRYSTALS EUTECTIC MIXTURES

[75] Inventors: Shin-Tson Wu, Northridge; J. David Margerum, Woodland Hills; Hsiang-Hui B. Meng, West Covina; Larry R. Dalton, Monterey, all of Calif.

[21] Appl. No.: 927,698
[22] Filed: Aug. 10, 1992
[51] Int. Cl.$^5$ .......................... C09K 19/52; F21V 9/04
[52] U.S. Cl. ................................ 252/299.01; 252/582; 252/587
[58] Field of Search ................ 252/299.01, 299.5, 582, 252/587

[56] References Cited

FOREIGN PATENT DOCUMENTS 4005882 8/1991 Fed. Rep. of Germany .

OTHER PUBLICATIONS

Applied Physics Letters, vol. 61, No. 6, Aug. 10, 1992, pp. 630–632., "Room Temperature Diphenyl–diacetylene Liquid Crystals", S. T. Wu.

Proceedings SPIE, Display Technologies, Taiwan Dec. 17–18, 1992, vol. 1815, pp. 268–273, "Fluorinated Diphynyl–diacetylene and Tolane Liquid Crystals for Display Applications", Y. N. Chen.

Applied Physics Letters, vol. 61, No. 19, Nov. 9, 1992, pp. 2275–2277, "Fluorinated Diphenyl–diacetylene and Tolane Liquid Crystals with Low Threshold Voltage", S. T. Wu.

(List continued on next page.)

Primary Examiner—Shean Wu
Attorney, Agent, or Firm—V. D. Duraiswamy; W. K. Denson-Low

[57] ABSTRACT

A new class of asymmetrical diphenyl-diacetylene liquid crystal compounds exhibit ideal properties for formulating eutectic mixtures suitable for infrared and microwave applications. The new class of liquid crystal compounds comprise asymmetrical nonpolar end groups. These compounds exhibit low melting points, wide nematic temperature range and low heat fusion enthalpy. Eutectic mixtures containing entirely diphenyl-diacetylene homologs using the new compounds have high birefringence, low viscosity and wide nematic range. These unique properties are especially advantageous when these mixtures are used in infrared spatial light modulators, high speed liquid crystal modulators and polymer dispersed liquid crystals shutters. The new asymmetrical diphenyl-diacetylene liquid crystal compounds comprise the following basic structure:

$$R_1-C_6H_4-C\equiv C-C\equiv C-C_6H_4-R_2$$

wherein $R_1$ and $R_2$ are nonpolar end groups and $R_1$ does not equal $R_2$. $R_1$ is selected from the group consisting of alkyl, alkoxy, alkenyl and alkenyloxy end groups and $R_2$ is selected from the group consisting of alkyl, alkenyl and alkenyloxy. In another embodiment, the liquid crystal compound can comprise an alkenyl group having the general formula $C_xH_{2x+1}CH=CH-(CH_2)_{n-2-x}$ in either the $R_1$ or $R_2$ location. Moreover, the liquid crystal compound can comprise such an alkenyl group in both $R_1$ and $R_2$ locations, so long as $R_1$ does not equal $R_2$. Eutectic mixtures for infrared and microwave applications comprise at least one asymmetrical nonpolar diphenyl diacetylene liquid crystal compound having the general structures described above.

12 Claims, 2 Drawing Sheets

OTHER PUBLICATIONS

Journal of Applied Physics, vol. 70, No. 6, Sep. 15, 1991, pp. 3013–3017, "Diphenyl–diacetylene Liquid Crystals for Electro–Optic Application", S. T. Wu.

Molecular Crystals and Liquid Crystals Bulletin, vol. 48, 1978, Reading GB, pp. 175–182, "Diacetylenic Liquid Crystals", B. Grant.

M. Schadt et al., "Polar Alkenyls: Physical Properties and Correlations with Molecular Structure of New Nematic Liquid Crystals", Molecular Crystals Liquid Crystals, vol. 122, pp. 241–260 (1985).

S. T. Wu et al., "Physical Properties of Diphenyldiacetylenic liquid crystals", J. Appl. Phys., vol. 65, No. 11, Jun. 1, 1989, pp. 4372–4376.

B. Grant et al., "Novel Liquid Crystalline Materials", Mol. Cryst. Liq. Cryst., vol. 51, Gordon and Breach Science Publishers, 1979, pp. 209–213.

Thesis of Young-Hong Lu; "Synthesis of Side-Chain Liquid Crystalline Polysiloxanes Containing trans-Cyclohexane or Diacetylene Based Mesogenic Side Groups", Jun. 1991, pp. iii and iv.

J. D. Margerum et al, "Formulation and Predicted Properties of Nematic Eutectic Mixtures of Esters", Mol. Cryst. Liq. Cryst., vol. III, Gordon and Breach Sci, Publishers, 1984, pp. 103–133.

E. C. H. Hsu et al., "Phase Diagrams of Binary Nematic Mesophase Systems", Mol in Cryst. Liq. Cryst. vol. 20, Gordon and Breach Science Publishers, pp. 177–190, 1973.

Shin-Tson Wu, "Birefringence Dispersions of Liquid Crystals", Phys. Rev. A., vol. 33, Third Series, No. 2, Feb. 1986, pp. 1270–1274.

I. Haller, "Thermodynamic and Static Properties of Liquid Crystals," Progress in Solid State Chemistry, vol. 10, Ed. McCaldin et al., Pergamon Press, 1975, pp. 103–118.

S. T. Wu et al., "Physical Properties of chlorinated liquid crystals," Liquid Crystals, vol. 10, No. 5, 1991, pp. 635–646.

S.T. Wu et al., "Experimental Confirmation of the Osipov-Terentjev Theory on the Viscosity of Nematic Liquid Crystals", Phys. Rev. A, vol. 42, Third Series, No. 4, Aug. 15, 1990, pp. 2219–2227.

M. A. Osipov et al., "Rotational Diffusion and Rheological Properties of Liquid Crystals", Crystallography Institute, Z. Naturforsch., 44 a, 1989, pp. 785–792.

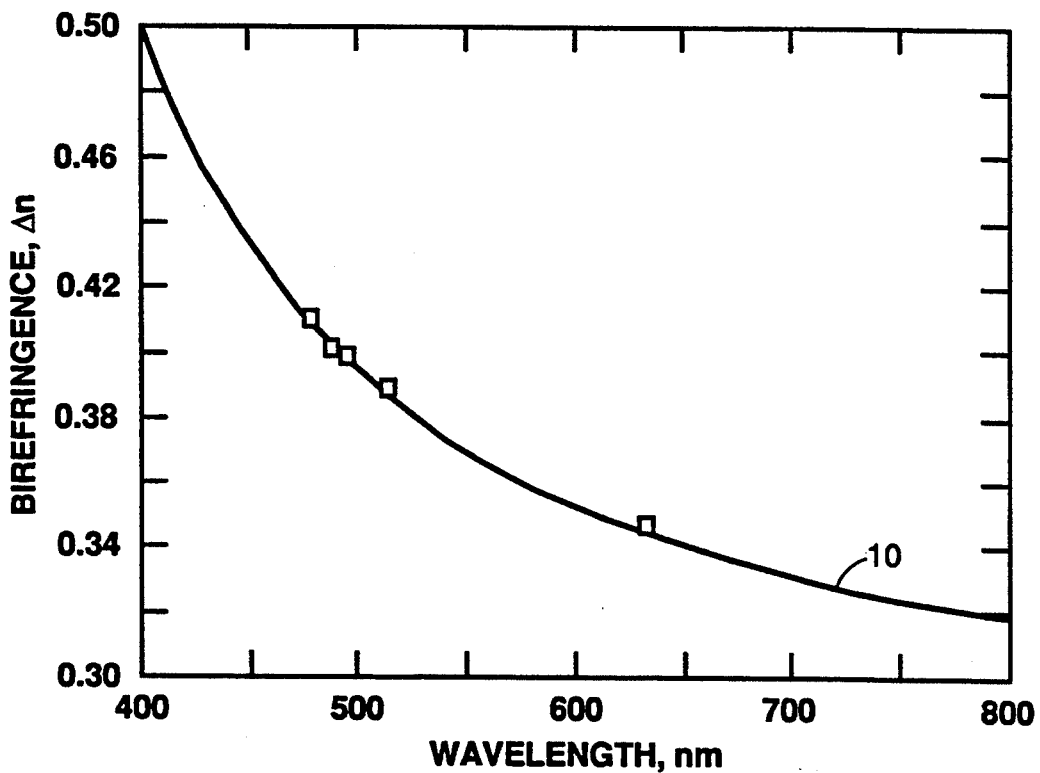
FIG. 1
FIG. 2
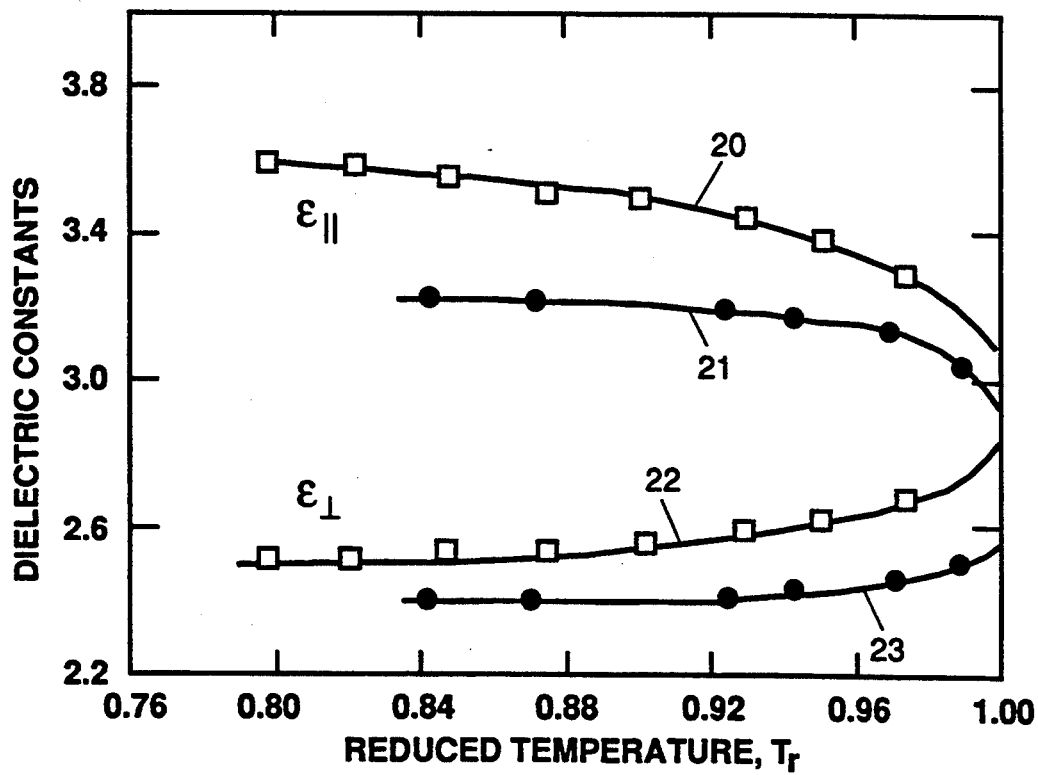

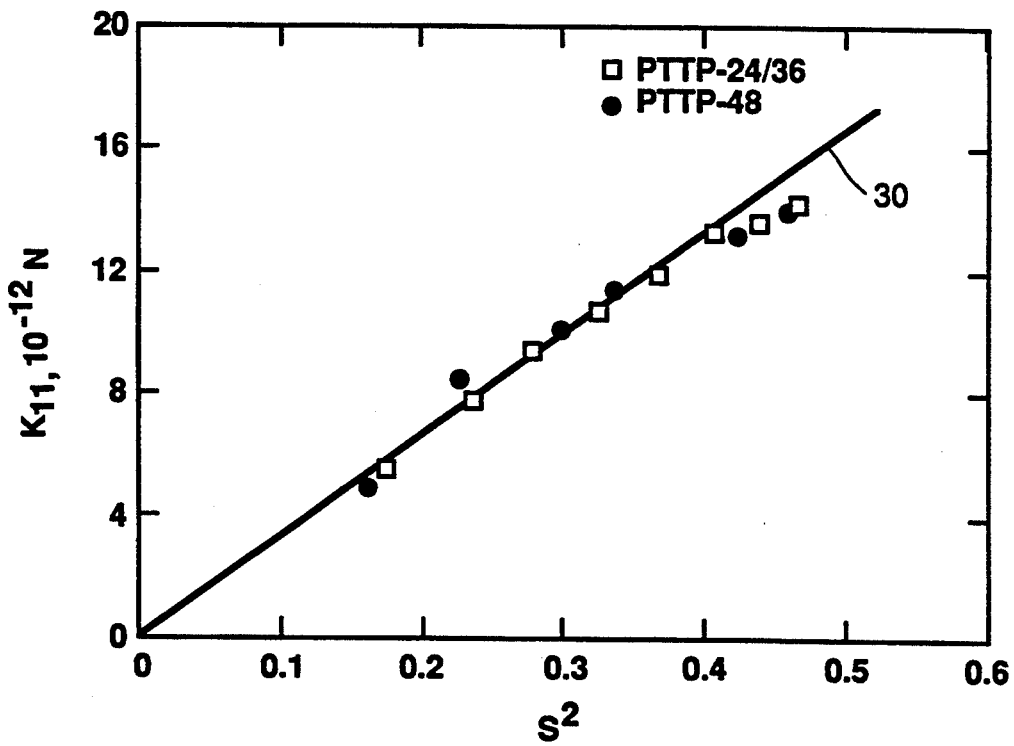
FIG. 3.
FIG. 4.
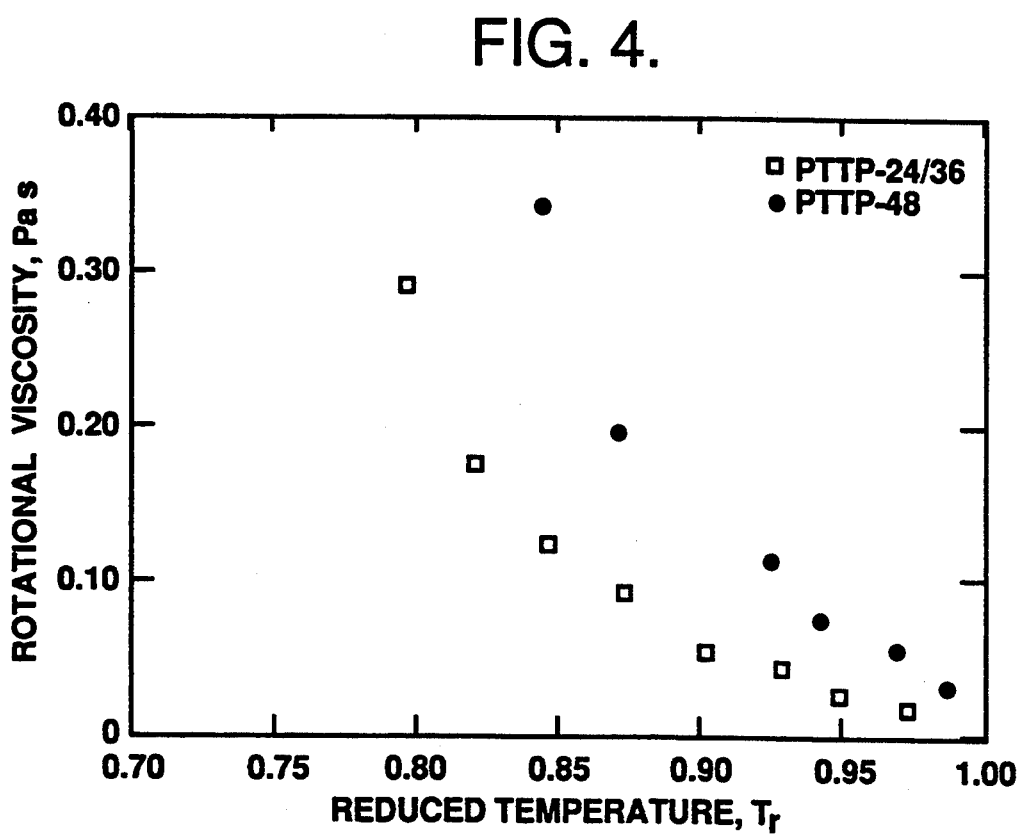

and Marine Engineers, New York (1988), incorporated herein by reference.

ASYMMETRICAL NONPOLAR DIPHENYL-DIACETYLENE LIQUID CRYSTALS EUTECTIC MIXTURES

BACKGROUND OF THE INVENTION

1. Field of the Invention

The present invention relates to liquid crystal materials and eutectic mixtures thereof for infrared and microwave applications. In particular, the invention is directed to a new class of diphenyl-diacetylene liquid crystal compounds and eutectic mixtures.

2. Description of the Related Art

Diphenyl-diacetylene liquid crystals are useful electro-optic media for modulating infrared radiation and for high speed light shutters. These liquid crystal materials possess not only high birefringence but also low rotational viscosity.

The symmetry and polarity of diphenyl-diacetylene liquid crystals are important to the overall properties of the liquid crystal. Properties, such as melting point ($T_{mp}$), birefringence ($\Delta n$), viscosity, threshold voltage ($V_{th}$), dielectric anisotropy ($\Delta \epsilon$) and heat fusion enthalpy ($\Delta H$), are influenced by the symmetry and polarity of the liquid crystal. These properties are important to the behavior of the liquid crystal in their applications as infrared spatial light modulators and polymer dispersed liquid crystal shutters. A high birefringence improves the light modulation efficiency; low viscosity shortens the response times; and low threshold voyage simplifies the driving electronics in these applications. Moreover, low threshold voltage is particularly attractive for polymer dispersed liquid crystal devices where the applied voltage is partially shielded by the polymer matrix so that the voltage drop across the liquid crystal droplets is far less than the applied voltage. Eutectic mixtures of diphenyldiacetylene liquid crystals are essential to infrared and microwave applications.

Both polar and nonpolar symmetrical diphenyl-diacetylene liquid crystals have been reported in articles by B. Grant, Mol. Cryst. Liq. Cryst., 48, 175 (1978); S. T. Wu et al., J. Appl. Phys., 65, 4372 (1989); and S. T. Wu et al., J. Appl. Phys., 70, 3013 (1991). It is disclosed that the symmetrical diphenyl-diacetylene liquid crystals exhibit high melting temperatures (nonpolar $T_{mp}>80°$ C.), narrow nematic temperature range ($\sim 25$ degrees), small dielectric anisotropy ($\Delta\epsilon 0.8$) and large heat fusion enthalpy $\Delta H$ relative to the ideal hosts for eutectic mixtures. High melting temperature is a result of long conjugation and small dielectric anisotropy is a result of high degree of symmetry of the liquid crystal molecules. Although increasing the alkyl chain length tends to reduce the melting point, disadvantageously, the increase in chain length will increase the viscosity and decrease the dielectric anisotropy.

Polar asymmetrical diphenyl-diacetylene liquid crystals are reported by B. Grant et al., Mol. Cryst. Liq. Cryst., 51, 209 (1979). These liquid crystals have a cyano group attach to a phenyl group on one side and an alkoxy group attached to another phenyl group on the other side of the diacetylene triple-triple bonds. These compounds show a large dielectric anisotropy, but the melting temperatures of these cyano alkoxy diphenyl-diacetylene homologs are exceedingly high (greater than 150° C.) and their nematic range is very narrow (only 5 degrees) relative to the ideal host for eutectic mixtures.

Fluorinated diphenyl-diacetylene liquid crystals are disclosed in German patent No. DE 40 05 882 A1. The German patent does not disclose experimental results or the properties of these fluorinated compounds. The melting temperatures are expected to be high and the nematic ranges thereof are expected to be narrow. Also the dielectric anisotropy ($\Delta\epsilon$) of laterally substituted fluoro-compounds is negative. The alignment for negative dielectric anisotropy, $\Delta\epsilon$liquid crystals is different from the liquid crystal compounds with positive dielectric anisotropy ($\Delta\epsilon$). For infrared and microwave applications, the liquid crystal should have a positive dielectric anisotropy ($\Delta\epsilon$). Therefore, eutectic mixtures consisting of these fluorinated homologs alone are not expected to exhibit a wide nematic temperature range or be practical for infrared and microwave applications.

The ideal host for eutectic mixtures should have properties, such as low viscosity (less than about 30 centipoises), low melting temperature (below 40° C., and preferably about room temperature), wide nematic temperature range (ranging from about $-40°$ C. to $+80°$ C.), low heat fusion enthalpy (less than about 5 kcal/mol) and high birefringence (greater than about 0.25). It would be desirable to have host liquid crystals which have these ideal properties for formulating eutectic mixtures for infrared and microwave applications.

SUMMARY OF THE INVENTION

In accordance with the invention, a new class of liquid crystal compounds are provided which exhibit ideal properties for formulating eutectic mixtures suitable for use in infrared and microwave applications. The new class of liquid crystals compounds are based on an asymmetrical diphenyldiacetylene structure with nonpolar end groups providing the asymmetry. These materials exhibit low melting points, wide nematic temperature range and low heat fusion enthalpy, as described above for an ideal host candidate for eutectic mixtures. Eutectic mixtures containing entirely diphenyl-diacetylene homologs using the new compounds according to the invention have high birefringence, low viscosity and wide nematic range. In the preferred embodiment, the new liquid crystal compounds comprise the following basic structure:

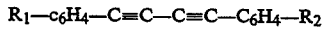

wherein $R_1$ is an alkyl, alkenyl, alkoxy or alkenyloxy end group and $R_2$ is alkyl, alkenyl or an alkenyloxy end group. When $R_1$ is an alkyl group, $R_1$ has the general formula ($C_nH_{2n+1}$); as an alkoxy group, the general formula ($OC_nH_{2n+1}$); as an alkenyl group, the general formula ($C_nH_{2n-1}$); and as an alkenyloxy group, the general formula ($OC_nH_{2n-1}$). When $R_2$ is an alkyl group, $R_2$ has the formula ($C_mH_{2m+1}$); as an alkoxy group, the general formula ($OC_mH_{2m+1}$); as an alkenyl group, the general formula ($C_mH_{2m-}$); and as an alkenyloxy group, the general formula ($OC_mH_{2m-1}$), and wherein n is not equal to m. In another embodiment, the liquid crystal compound can comprise an alkenyl group having the general formula $C_xH_{2x+1}CH=CH-(CH_2)_{n-2-x}$in either the $R_1$ or $R_2$ locations, so long as $R_1$ does not equal $R_2$.

Eutectic mixtures according to the invention comprise at least one asymmetrical diphenyl-diacetylene liquid crystal compound having the structure described above.

Diphenyl-diacetylene liquid crystal compounds and eutectic mixtures according to the invention exhibit low viscosity of less than about 30 centipoises, high birefringence greater than about 0.25, wide nematic temperature range of about −40° C. to +80° C., low melting temperatures less than about 40° C., and low heat of fusion enthalpy of less than about 5 kcal/mole. These and other features and advantages of the present invention will be apparent from the following more detailed description of the preferred embodiments, taken in conjunction with the accompanying drawings, which illustrate by way of example, the principles of the invention.

BRIEF DESCRIPTION OF THE DRAWINGS

FIG. 1 is a graphical illustration of wavelength dependent birefringence of a eutectic mixture according to the present invention.

FIG. 2 is a graphical illustration of reduced temperature dependent dielectric constants of a eutectic mixture according to the present invention.

FIG. 3 is a graphical illustration of temperature dependent splay elastic constant of eutectic mixtures according to the invention.

FIG. 4 is a graphical illustration of reduced temperature dependent rotational viscosity of eutectic mixtures according to the invention.

DESCRIPTION OF THE PREFERRED EMBODIMENTS

At least 20 asymmetrical alkyl-alkyl, 5 alkyl-alkoxy, and 5 polar diphenyl-diacetylene liquid crystals were synthesized and their properties were compared to 5 symmetrical diphenyl-diacetylene liquid crystals.

A general procedure for the preparation of the liquid crystal compounds according to the invention is known in the art and can be found, for example, in B. Grant, Mol. Cryst. Liq. Cryst., 48 175 (1978). For the preparation of 4-n-alkylphenylacetylene (shown below as formula (II)), a suspension of 33.1 grams (0.1 mole) carbon tetrabromide ($CBr_4$), 6.5 grams (0.1 mole) zinc (Zn) powder and 26.2 grams (0.1 mole) of triphenylphosphine in 340 milliliters of methylene chloride ($CH_2Cl_2$) was stirred at room temperature for 48 hours (the suspension was purple in color). To the suspension, 0.05 mole 4-n-alkylbenzaldehyde was added and stirred for an additional 1.5 hours. The suspension was filtrated and the filtrate was evaporated resulting in a crude dibromoolefin ($\beta,\beta$-dibromostyrene, formulas (I) or (III)), as shown in Equation (1a) below. The $\beta,\beta$-dibromostyrene (I) was purified by chromatography on silica gel with a solvent, preferably hexane, using a purification procedure disclosed in B. Grant, Mol. Cryst. Liq. Cryst., 48 175 (1978) and also see the Thesis of Yong-Hong Lu, "Synthesis of Side-Chain Liquid Crystalline Polysiloxanes Containing trans-Cyclohexane or Diacetylene Based Mesogenic Side Groups", submitted to the Institute of Applied Chemistry, National Chiao Tung University, Hsinchu, Taiwan, Republic of China, June 1991 for Master of Science in Applied Chemistry, (incorporated herein by reference). The purified olefin ($\beta,\beta$-dibromostyrene (I)) in 50 milliliters of dry tetrahydrofuran (THF) at −78° C. under $N_2$ atmosphere was treated with butyl lithium (2 equivalents) and stirred at −78° C. for an hour, followed by one hour at room temperature. The reaction was quenched with water, and the ethereal layer was separated. After re-extraction of the aqueous layer with ether, the combined extracts were washed with water, dried in $MgSO_4$, evaporated to dryness and purified by chromatography, as stated above, to give the 4-n-alkylphenylacetylene (formula II), as shown in Equation (1b) below:

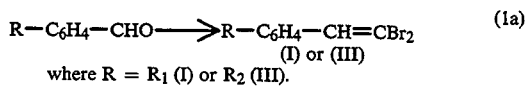

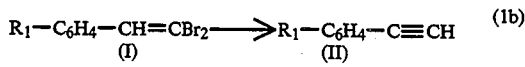

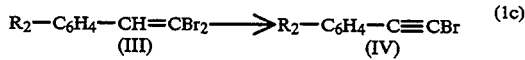

The $\beta,\beta$-dibromostyrene (formula III) in a quantity of 5.74 grams (0.02 mole) and 2.24 grams (0.02 mole) potassium t-butoxide in 75 milliliters of toluene were heated at reflux for 4 hours. The reaction was cooled to room temperature, filtered and the filtrate was evaporated to dryness and purified by chromatography on silica gel (with the purification procedure mentioned above) to give the bromoacetylide (formula IV), as shown in Equation (1c) above.

The bromoacetylide (IV) in an amount of 3.2 grams (0.015 mole) was stirred in 50 milliliters of ethanol and added portionwise to a stirred solution containing 747 milligrams $NH_2OH\cdot HCl$, 14.9 milliliters n-butylamine, 10 milligrams cuprous chloride and 0.015 mole 4-n-alkylphenylacetylene (II) in 50 milliliters ethanol. After 1.5 hours, the product was removed by filtration and purified by chromatography on silica gel, as mentioned above, to give the diphenyl-diacetylene product (formula V), as shown in Equation 2, according to the invention:

Equation (2)

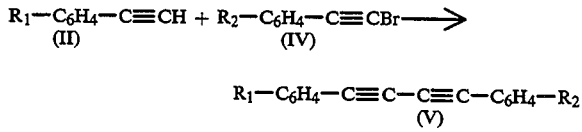

Hereinafter, diphenyl-diacetylene liquid crystals will be abbreviated PTTP-nm, in which P stands for phenyl ring, T stands for triple bond and n and m refer to the number of carbons in the respective alkyl group. For example, PTTP-24 refers to a two carbon alkyl group on one end of the phenyl-triple bond-triple bond-phenyl and a four carbon alkyl group on the other end. Alternatively, PTTP-n'm or PTTP-n'm' refer to -alkenyl groups. For example, PTTP-2'4' refers to a two carbon alkenyl group on one end of the phenyl-triple bond-triple bond-phenyl and a four carbon alkenyl group on the other end. Likewise, -n" and/or -m" refers to alkoxy and -n'" and/or -m'" refer to alkenyloxy groups. Table 1 lists the combination of nonpolar end groups for $R_1$ and $R_2$, according to the invention.

TABLE 1

| $R_1$ | $R_2$ |
|---|---|
| Alkyl | Alkyl |
| Alkyl | Alkenyl |
| Alkyl | Alkenyloxy |
| Alkoxy | Alkenyl |
| Alkoxy | Alkenyloxy |
| Alkenyl | Alkenyl |
| Alkenyl | Alkenyloxy |

TABLE 1-continued

| R₁ | R₂ |
|---|---|
| Alkenyloxy | Alkenyloxy |

Properties such as phase transition temperature, melting point and molar heat fusion enthalpy of the synthesized liquid crystals are reported in Table 2 below. The corresponding values for the known symmetrical liquid crystals (highlighted in bold print) were obtained from B. Grant, Mol. Cryst. Liq. Cryst.,48, 175 (1978) and S. T. Wu et al., J. Appl. Phys., 70, 3013 (1991) (cited previously) and incorporated herein by reference.

Common to the nonpolar symmetrical liquid crystals are melting temperatures greater than about 80° C., while the polar symmetrical liquid crystals have melting temperatures greater than about 150° C. Moreover, the

TABLE 2

| PTTP-nm | $T_{mp}$ (°C.) | $T_c$ (°C.) | ΔH (kcal/mole) |
|---|---|---|---|
| Dialkyl | | | |
| 13 | 102.5 | 112.4 | 3.65 |
| 14 | 75.8 | 99.2 | 3.90 |
| 15 | 81.0 | 104.7 | 3.06 |
| 16 | 77.5 | 87.5 | 5.59 |
| 18 | 78.8 | 82.5 | 5.45 |
| 22 | 98.0 | 88.0 | 4.90 |
| 23 | 79.2 | 113.5 | 5.51 |
| *24 | 43.6 | 97.7 | 2.47* |
| 25 | 44.7 | 101.7 | 4.26 |
| 26 | 50.7 | 84.2 | 4.16 |
| 28 | 41.7 | 77.9 | 4.39 |
| 33 | 107.5 | 131.9 | 6.00 |
| 34 | 83.7 | 115.0 | 3.53 |
| 35 | 62.0 | 115.3 | 3.41 |
| *36 | 41.5 | 97.5 | 2.91* |
| 38 | 44.6 | 87.5 | 4.23 |
| 44 | 75.1 | 101.0 | 3.40 |
| 45 | 63.5 | 104.2 | 3.17 |
| 46 | 24.9 | 79.7 | 4.84 |
| 48 | 25.1 | 78.9 | 4.15 |
| 55 | 86.0 | 111.3 | 4.60 |
| 56 | 60.0 | 97.8 | 3.49 |
| 58 | 40.7 | 88.5 | 3.20 |
| 66 | 58.6 | 85.3 | — |
| *68 | 34.1 | 77.5 | 2.54* |
| Alkyl-alkoxy | | | |
| 2O2 | 104.4 | 162.5 | 5.33 |
| 3O2 | 88.0 | 187.7 | 4.42 |
| 4O2 | 98.4 | 142.1 | 5.82 |
| 5O2 | 68.5 | 123.7 | 6.62 |
| 6O2 | 84.7 | 108.3 | 6.02 |
| Polar | | | |
| 6CN | (145.3) | 144.0 | 8.06 |
| 8CN | (139.7) | 135.8 | 10.12 |
| 2Cl | 143.7 | | 8.76 |
| 4Cl | 126.7 | | 8.85 |
| 6Cl | 112.9 | | 6.87 | polar PTTP-6CN and -8CN, upon melting, are monotropic in that they transition to the isotropic liquid phase before reaching the liquid crystal phase. The melting temperatures for PTTP-6CN and PTTP-8CN, therefore, are listed in parentheses in Table 2 to distinguish these melting temperatures from the other liquid crystals which transition from the solid phase-to-liquid crystal-to-isotropic liquid phase upon melting.

Also evident from Table 2 is that increasing the alkyl chain length will tend to reduce the melting temperature, but not shown in Table 2 is that the increasing alkyl chain length will increase the viscosity and decrease the dielectric anisotropy to unacceptable levels.

The asymmetrical nonpolar diphenyl-diacetylene liquid crystal compounds according to the invention unexpectedly showed a lower melting point and wider nematic temperature range ($T_c$–Tmp) than the symmetrical liquid crystals with the same total chain length. Moreover, the melting temperatures of PTTP-46 and -48 were unexpectedly as low as about 25° C.

Even more unexpected and quite advantageous is that three asymmetrical dialkyl PTTP samples, PTTP-24, -36, and -68 (highlighted by an asterisk * in Table 2), show modest melting temperatures (less than about 45° C.) and unexpectedly low molar heat of fusion enthalpy (less than about 3 kcal/mole).

The asymmetrical nonpolar liquid crystal compounds according to the invention have the basic structure:

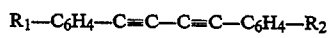

wherein $R_1$ and $R_2$ are nonpolar end groups and $R_1$ does not equal $R_2$, thereby making the diphenyl-diacetylene liquid crystal asymmetrical. According to a first embodiment, $R_1$ and $R_2$ are taken from Table 1. When $R_1$ is an alkyl group, $R_1$ preferably has the general formula ($C_nH_{2n+1}$). As an alkoxy group, $R_1$ preferably has the general formula ($OC_nH_{2n+1}$). As an alkenyl group, $R_1$ preferably has the general formula ($C_nH_{2n-1}$); and as an alkenyloxy group, $R_1$ preferably has the general formula ($OC_nH_{2n-1}$). When $R_2$ is an alkyl group, $R_2$ preferably has the formula ($C_mH_{2m+1}$); the general formula ($C_mH_{2m-1}$) as an alkenyl group; and as an alkenyloxy group, $R_2$ preferably has the general formula ($OC_mH_{2m-1}$). In each case above for $R_1$ and $R_2$, n is not equal to m. For the invention, n ranges from 1 to 12 and m ranges from 1 to 12.

In a second embodiment, $R_1$ is an alkenyl group having the general formula $C_xH_{2x+1}CH=CH-(CH_2)_{n-2-}$ where n ranges from 2 to 12 and x ranges from 0 to 10. $R_2$ is the same as described above for the first embodiment.

In a third embodiment, both $R_1$ and $R_2$ are alkenyl end groups, wherein $R_1$ is as described above for the second embodiment and $R_2$ has the general formula $C_yH_{2y+1}CH=CH-(CH_2)_{n-2-y}$, where x is not equal to y and y ranges from 0 to 10. Table 2 has data for the first embodiment of the invention and other liquid crystal compounds as a comparison.

It is known from the Schroder-van Laar equation (reported in E. C. H. Hsu et al., Mol. Cryst. Liq. Cryst., 20, 177 (1973) and incorporated herein by reference) that low melting temperature and small molar heat of fusion enthalpy of an individual liquid crystal component of a eutectic mixture play equally important roles in determining the melting point of the eutectic mixture. Therefore, the asymmetrical PTTPs are excellent host candidates for forming eutectic mixtures with wide nematic range.

A binary eutectic mixture according to the invention was formulated containing 52 weight percent of PTTP-24 and 48 weight percent PTTP-36 (PTTP-24/36). The melting point of the mixture dropped to 10° C. and the clearing point remained at 97.7° C. The nematic temperature range, calculated as in J. D. Margerum et al., Mol. Cryst. Liq. Cryst., 111 ,103 (1984) (incorporated herein by reference) ranged from 0° to 98° C. The melting point of the eutectic mixture can be lowered further by formulating multi-component PTTP eutectic mixtures using carefully chosen PTTP liquid crystal homologs.

The wavelength dependent birefringence of PTTP-24/36, as illustrated in FIG. 1, was measured at 22.8° C.

using tunable Ar+ and HeNe lasers. The solid line 10 represents the fitting with the single-band birefringence dispersion model obtained from Wu, Phys. Rev. A., 30, 1270 (1986), incorporated herein by reference:

$$\Delta n = G(T)(\lambda^2 \lambda^{*2})/(\lambda^2 - \lambda^{*2}) \quad (3)$$

where G is a proportionality constant which determines the temperature effect, T is the temperature, $\lambda^*$ is the mean electronic resonance wavelength and $\lambda$ is the wavelength of measurement. From FIG. 1, $G = 4.108 \times 10^{-6}$ nm$^2$ and $\lambda^* = 263.5$ nm were obtained. Substituting these parameters back to Eq. (3), the birefringence $\Delta n$ in the infrared region (where $\lambda \gg \lambda^*$) was calculated ($\sim G\lambda^{*2}$) to be 0.285. Such a high birefringence $\Delta n$ makes these materials particularly attractive for modulating IR and microwave radiation where the photostability is not a problem.

Temperature dependent birefringence of PTTP-24/36 and PTTP-48 were measured at $\lambda = 632.8$ nm. Results (not shown) fit well with Haller's equation, as disclosed in I. Hailer, Prog. Solid State Chem., 10, 103 (1975) and incorporated herein by reference, except near the phase transition region where Haller's equation is invalid:

$$\Delta n = \Delta n_o S \quad (4a)$$

$$S = [1 - T_r]^\beta \quad (4b)$$

where $\Delta n_o$ is the birefringence at $T_r = 0$ or $S = 1$, as if the liquid crystal were in its completely ordered state; S is the order parameter of the second rank; $T_r = T/T_c$ is the reduced temperature, where $T_c$ is the clearing point, and $\beta$ is an exponent which is dependent on an individual material. From the experimental results, the $[\Delta n_o, \beta]$ values for PTTP-24/36 and PTTP-48 were found to be [0.521, 0.241] and [0.434, 0.211], respectively. From $\beta$, the order parameter S was computed from Equation (4b) for different reduced temperatures ($T_c$).

The dielectric constants of PTTP-24/36 and PTTP-48 were measured by the single cell method reported in S. T. Wu et al., Liq. Cryst., 10, 635 (1991), incorporated herein by reference, and the results are illustrated in FIG. 2. In general, the dielectric constants and the anisotropy ($\Delta\epsilon$) of the nonpolar liquid crystals are small. Small ($\Delta\epsilon$) results in a large Freedericksz transition threshold voltage ($V_{th}$) (obtained from V. Freedericksz and V. Zolina, Trans. Faraday Soc., 29, 919 (1933)), incorporated herein by reference, as:

$$V_{th} = \pi[K_{11}/\epsilon_o \Delta\epsilon]^{\frac{1}{2}} \quad (5)$$

wherein $K_{11}$ is the splay elastic constant and $\epsilon_o$ is the permittivity of vacuum. The data illustrated in FIG. 2 includes both the parallel ($\epsilon\parallel$) and perpendicular ($\epsilon\perp$) dielectric constants for PTTP-24/36 (20) and (22), respectively, and for PTTP-48 (21) and (23), respectively. From the data shown in FIG. 2, the dielectric anisotropy of PTTP-24/36 ($\Delta\epsilon$ is approximately 1) is slightly larger than that of PTTP-48 ($\Delta\epsilon$ is approximately 0.8) at room temperature which corresponds to a reduced temperature $T_r$ of approximately 0.84 owing to the shorter chain length.

To improve the dielectric anisotropy $\Delta\epsilon$, polar PTTPs can be added to the mixture. For example, the binary mixture of PTTP-6CN and -8CN (with 1:1 ratio) shows a nematic range from 114° to 135° C. The dielectric anisotropy $\Delta\epsilon$ of this mixture was measured by the guest-host method to be $\Delta\epsilon = 17$ at 1 KHz sine wave frequency and the birefringence $\Delta n = 0.438$ (where the refractive index of the ordinary ray ($n_o$) = 1.495 and the refractive index of the extraordinary ray ($n_e$) = 1.933 at a wavelength ($\lambda$) = 589 nm and temperature (T) = 22° C.). According to this method, approximately 10 percent of the compound to be studied was dissolved in a host liquid crystal. The host mixture employed was ZLI-1132 (Merck, Germany), because it exhibited a reasonably wide nematic range (from $-40°$ to $+71°$ C.) so that adding 10 percent of a guest host compound cause little change on the clearing point of the mixture.

The threshold voltages of PTTP-24/36 and -48 were measured by voltage dependent capacitance and voltage dependent birefringence methods (see Wu et al., Liq. Cryst., 10, 635 (1991) which is incorporated herein by reference). Results obtained from both methods agree to within 2 percent. The threshold voltage $V_{th}$ at room temperature (or $T_r = 0.84$) and 1 KHz sine wave frequency is 4.34 and 3.83 $V_{rms}$ for PTTP-48 and PTTP-24/36, respectively. As temperature increases, the threshold voltage decreases. From the threshold voltage data and the dielectric constants shown in FIG. 2, the temperature dependent splay elastic constant $K_{11}$ is obtained for PTTP-24/36 and PTTP-48, as illustrated in FIG. 3. The data for PTTP-24/36 and PTTP-48 fall close to solid line 30 in FIG. 3. These results are used in the mean-field theory, as discussed in W. Maier et al., Z. Naturforsch Teil A 14, 882 (1959), incorporated herein by reference, where:

$$K_{11} = A_o S^2 \quad (6)$$

From FIG. 3, the proportionality constant $A_o$ is found to be $3 \times 10^{-11}$ Newton for both PTTP-24/36 and PTTP-48.

To evaluate the rotational viscosity ($\gamma_1$), the viscoelastic coefficient ($\gamma_1/K_{11}$) was obtained from the decay time of a liquid crystal cell. See for example S. T. Wu et al., Phys. Rev. A 42, 2219 (1990), which is incorporated herein by reference. Once the viscoelastic coefficient ($\gamma_1/K_{11}$) was obtained, the rotational viscosity ($\gamma_1$) was evaluated by using the $K_{11}$ results illustrated in FIG. 3. Experimental results of the temperature dependent rotational viscosity $\gamma_1(T)$ are illustrated in FIG. 4 for PTTP-24/36 and PTTP-48. The rotational viscosity $\gamma_1$ is a complex function of temperature, as described in Wu et al., Phys. Rev. A, 42, 2219 (1990) and M. Osipov et al., Z. Naturforsch. Teil A 44, 785 (1989), both incorporated herein by reference, because the rotational viscosity $\gamma_1$ depends not only on the absolute temperature, but also on the reduced temperature ($T_r$). From FIG. 4, PTTP-48 exhibits a larger rotational viscosity than PTTP-24/36 mixture at a given reduced temperature ($T_r$). This is because PTTP-48 possesses a larger moment of inertia due to its longer chain length.

There has been disclosed a new class of liquid crystal compounds, asymmetrical nonpolar diphenyl-diacetylene liquid crystal compounds, which have high birefringence and low viscosity and unexpectedly possess low melting temperature, wide nematic range and small heat of fusion enthalpy. These compounds contain either dialkyl, alkylalkenyl, dialkenyl, alkylalkenyloxy, alkoxyalkenyl, alkoxyalkenyloxy, alkenylalkenyloxy or dialkenyloxy end groups. These compounds are excellent host candidates for eutectic mixtures and the dielectric anisotropy of the mixtures can be enhanced by adding polar PTTP compounds, such as the polar liquid crystals from Table 2. The compounds and mixtures according to the invention are expected to be very useful media for IR and microwave modulators where photostability is not a problem. Changes and modifications may be made to the invention which may be readily apparent to those skilled in the art without going beyond the intended scope of the invention, as defined in the appended claims.

What is claimed is:

1. A diphenyl-diacetylene liquid crystal compound comprising:

the general structure of

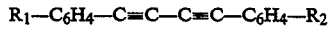

wherein $R_1$ is selected from the group consisting of an alkyl group having the general formula $(C_nH_{2n+1})$, an alkoxy group having the general formula $(OC_nH_{2n+1})$, wherein n ranges from 1 to 12; an alkenyl group having the general formula $(C_nH_{2n-1})$ and an alkenyloxy group having the general formula $(OC_nH_{2n-1})$, wherein n ranges from 2 to 12;

$R_2$ is independently selected from the consisting of an alkyl having the general formula $(C_mH_{2m+1})$, wherein m ranges from 1 to 12; an alkenyl group having the general formula $(C_mH_{2m-1})$ and an alkenyloxy group having the general formula $(OC_mH_{2m-1})$, wherein m ranges from 2 to 12; and n is not equal to m.

2. The diphenyl-diacetylene liquid crystal compound of claim 1, wherein one of $R_1$ and $R_2$ is an alkenyl group having the general formula $C_xH_{2x+1}CH=CH-(CH_2)_{n-2-x}$, n ranges from 2 to 12 and x ranges from 0 to 10.

3. The diphenyl-diacetylene liquid crystal compound of claim 1, wherein $R_1$ is an alkenyl group having the general formula $C_xH_{2x+1}CH=CH-(CH_2)_{n-2-x}$ and $R_2$ is an alkenyl group having the general formula $C_yH_{2y+1}CH=CH-(CH_2)_{n-2-y}$, n ranges from 2 to 12, x and y range from 0 to 10, and x does not equal y.

4. The diphenyl-diacetylene liquid crystal compound of claim 1 having a low viscosity less than approximately 30 centipoises and a high birefringence ($\Delta n$) greater than approximately 0.25, a low melting temperature less than approximately 40° C., a wide nematic temperature range of approximately $-40°$ C. to $+80°$ C. and small heat of fusion enthalpy less than approximately 5 kcal/mole for infrared and microwave applications.

5. The liquid crystal compound of claim 4, wherein the compound is selected from the group consisting of ethylbutyl diphenyl-diacetylene, propylhexyl diphenyl-diacetylene, butylhexyl diphenyl-diacetylene, butyloctyl diphenyl-diacetylene and hexyloctyl diphenyl-diacetylene.

6. A eutectic mixture of liquid crystal compounds comprising:

a first diphenyl-diacetylene liquid crystal compound having the general structure:

wherein $R_1$ is selected from the group consisting of an alkyl group having the general formula $(C_nH_{2n+1})$, an alkoxy group having the general formula $(OC_nH_{2n+1})$, wherein n is ranges from 1 to 12 an alkenyl group having the general formula $(C_nH_{2n-1})$ and an alkenyloxy group having the general formula $(OC_nH_{2n-1})$, wherein n ranges from 2 to 12;

$R_2$ is independently selected from he group consisting of an alkyl group having the general formula $(C_mH_{2m+1})$, wherein m range from 1 to 12 an alkenyl group having the general formula $(C_mH_{2m-1})$ and an alkenyloxy group having the general $(OC_mH_{2m-1})$, wherein m ranges from 2 to 12; and n is not equal m ; and a second diphenyl-diacetylene liquid crystal having the general structure:

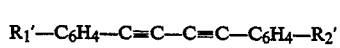

wherein $R_1'$ is either selected from the nonpolar group consisting of an alkyl group having the general formula $(C_{n'}H_{2n'+1})$, an alkoxy group having the general formula $(OC_{n'}H_{2n'+1})$, wherein n' ranges from 1 to 12 alkenyl yl group having the general formula $(C_{n'}H_{2n'-1})$ and an alkenyloxy group having the general formula $(OC_{n'}H_{2n'-1})$, wherein n' ranges from 2 to 12, or from the polar group consisting of CN, Cl, and F; and $R_2'$ is independently selected from the nonpolar group consisting of an alkyl group having the general formula $(C_{m'}H_{2m'-1})$, wherein m' ranges from 1 to 12; an alkenyl group having the general formula $(C_{m'}H_{2m'-})$ and an alkenyloxy group having the general formula $(OC_{m'}H_{2m'-1})$, wherein m' ranges from 2 to 12, or where $R_2'$ is selected from the polar group consisting of CN, Cl, and F.

7. The eutectic mixture of claim 6 having a low viscosity less than approximately 30 centipoises and a high birefringence ($\Delta n$) greater than approximately 0.25, a low melting temperature less than approximately 40° C., a wide nematic temperature range of approximately $-40°$ C. to $+80°$ C. and small heat of fusion enthalpy less than approximately 5 kcal/mole.

8. The eutectic mixture of liquid crystal compounds of claim 7, wherein $R_1'$ and $R_2'$ are nonpolar groups, $R_1'$ does not equal $R_2'$ and $R_1'$ and $R_2'$ do not equal $R_1$ and $R_2$.

9. The eutectic mixture of liquid crystal compounds of claim 8, wherein the first liquid crystal compound is ethylbutyl diphenyl-diacetylene and the second liquid crystal compound is propylhexyl diphenyl-diacetylene.

10. The eutectic mixture of liquid crystal compounds of claim 7, wherein at least one of $R_1'$ and $R_2'$ is a polar group and $R_1'$ does not equal $R_2'$.

11. The eutectic mixture of liquid crystal compounds of claim 10, wherein $R_1'$ is selected from the group consisting of alkyl, alkoxy, alkenyl and alkenyloxy end groups and $R_2'$ is selected from the group consisting of CN, Cl, and F.

12. The eutectic mixture of liquid crystal compounds of claim 7, wherein $R_1'$ and $R_2'$ are polar groups and $R_1'$ equals $R_2'$.

* * * * *

UNITED STATES PATENT AND TRADEMARK OFFICE
CERTIFICATE OF CORRECTION

PATENT NO. : 5,338,481
DATED : August 16, 1994
INVENTOR(S) : Larry R. Dalton

It is certified that error appears in the above-indentified patent and that said Letters Patent is hereby corrected as shown below:

Title page, item [73], Assignee: should read-- Hughes Aircraft Company and University of Southern California--.

Signed and Sealed this

Twenty-sixth Day of September, 1995

Attest:

BRUCE LEHMAN

Attesting Officer    Commissioner of Patents and Trademarks